United States Patent
Mena et al.

(10) Patent No.: US 10,283,963 B1
(45) Date of Patent: May 7, 2019

(54) DYNAMIC POWER SUPPLY SENSOR FOR MULTI-POWER SUPPLY APPLICATIONS

(71) Applicant: Teledyne LeCroy, Inc., Thousand Oaks, CA (US)

(72) Inventors: Juan P. Mena, Norwalk, CT (US); Philippe Convers, Monroe, NY (US)

(73) Assignee: Teledyne LeCroy, Inc., Thousand Oaks, CA (US)

( * ) Notice: Subject to any disclaimer, the term of this patent is extended or adjusted under 35 U.S.C. 154(b) by 0 days.

(21) Appl. No.: 15/683,991

(22) Filed: Aug. 23, 2017

(51) Int. Cl.
*H02J 3/18* (2006.01)
*H02J 9/06* (2006.01)
*G05F 1/62* (2006.01)
*G05B 13/02* (2006.01)
*G05F 1/66* (2006.01)

(52) U.S. Cl.
CPC .......... *H02J 3/1892* (2013.01); *G05B 13/021* (2013.01); *G05F 1/62* (2013.01); *G05F 1/66* (2013.01); *H02J 9/06* (2013.01)

(58) Field of Classification Search
CPC ........ H02J 3/1892; H02J 9/06; G05B 13/021; G05F 1/62; G05F 1/66
USPC .......................................................... 375/142
See application file for complete search history.

(56) References Cited

U.S. PATENT DOCUMENTS

| | | | |
|---|---|---|---|
| 5,955,893 A * | 9/1999 | Chang | H03K 19/018521 326/121 |
| 5,978,192 A * | 11/1999 | Young | H02H 9/046 361/111 |
| 7,436,251 B2 | 10/2008 | Ozgun et al. | |
| 9,436,253 B2 | 9/2016 | Lee et al. | |
| 2014/0132228 A1 * | 5/2014 | Lin | H02M 1/32 323/207 |
| 2014/0346881 A1 * | 11/2014 | Wang | H02M 3/158 307/52 |

OTHER PUBLICATIONS

Yu-Huei Lee et al., "A DVS Embedded Power Management for High Efficiency Integrated SoC in UWB System", IEEE Journal of Solid-State Circuits, Vo.. 45, No. 11, Nov. 2010, pp. 2227-2238.
L. Benini et al., "Dynamic Power Management: Design Techniques and CAD Tools", Springer Science+Business Media, LLC, 1998, pp. 1-239.

* cited by examiner

*Primary Examiner* — Michael R Neff
(74) *Attorney, Agent, or Firm* — Andrew Dommer

(57) ABSTRACT

In general, the subject matter described in this disclosure can be embodied in a system that implements power supply protection. The system includes first circuitry, second circuitry, a first power supply that is configured to power the first circuitry, and a second power supply that is configured to power the first circuitry and the second circuitry. The system also includes a power supply sensor including an input that is connected to the first power supply, and an output. The system also includes a hysteresis buffer including an input that is connected to the output of the power supply sensor, and an output that is connected to the first circuitry in a configuration that transitions the first circuitry to a protected state as a result of the hysteresis buffer transitioning output states.

20 Claims, 2 Drawing Sheets

DYNAMIC POWER SUPPLY SENSOR FOR MULTI-POWER SUPPLY APPLICATIONS

TECHNICAL FIELD

The technology relates to detecting power supply variations in multi-power supply systems that implement dynamic power management.

BACKGROUND

Dynamic power management (DPM) has become an attractive solution for reducing power consumption in integrated circuits (ICs). DPM targets sub-circuits (e.g., circuit blocks) that sometimes perform tasks for short periods of time and enables the system to change power supply levels to those sub-circuits, hence minimizing power consumption. Depending on the sub-circuit block and its purpose, the power supply can be turned off when the sub-circuit block is not needed, or its potential can be decreased when the sub-circuit block is to operate with lower performance. There are different detection and power supply control management techniques for DMP [H, Lee, "A DVS Embedded Power Management for High Efficiency Integrated SoC in UWB System", IEEE Journal of Solid-State Circuits, Vol. 45, pp. 2227-2238, November 2010], [Lee, "Dynamic voltage frequency scaling method and apparatus," U.S. Pat. No. 9,436,253, Sep. 6, 2016], and their efficacy may depend on the application.

Some DPM schemes control the operation and supply levels of digital circuits [L. Benini and G. DeMicheli, "Dynamic power management: design, techniques, and CAD tools", Springer Science+Business Media, LLC, New York, 1998], but DPM can also be used in analog circuits with a single power supply with a voltage lower than the maximum tolerance of devices such as transistors. Hence, turning off or reducing the power supply may not compromise the reliability of the system. As an example, a method proposed by Y. Tsividis, et. al., "Dynamic Power Management of Analog Signal Processors", U.S. Pat. No. 7,436,251 B2, Oct. 14, 2008, selects the signal path according to the signal level to optimize the power consumption. This method, however, does not provide a solution to power down circuits with multiple power supplies.

OBJECTS OF THE TECHNOLOGY

It is an object of the technology to provide a power supply sensor that generates a signal when a power supply level changes.

It is another object of the technology to apply the sensor signal to protect a circuit dependent on multiple power supplies.

It is another object of the technology to minimize the number of control signals to minimize the risk of user error.

It is another object of the technology to implement DPM in circuits using fewer power supplies.

It is another object of the technology to implement DPM in circuits in which DPM could not previously have been implemented.

SUMMARY OF THE TECHNOLOGY

Circuitry that is powered by two power supplies may be harmed if one of the power supplies is turned off or reduced in potential to save energy while the other remains on. To prevent harm to the circuitry, the voltage level of the one power supply that may turn off is monitored. The monitoring of the voltage level may be performed using a diode-resistor network that generates an output voltage over the resistor (a resistor divider is an alternative mechanism). The rate of change of the output voltage can be increased using a hysteresis buffer to add faster output transition. The output of the hysteresis buffer can control a bias circuit switch that is connected to the circuitry that is powered by the two power supplies, which turns on and off a current mirror which provides a DC operational point of the circuitry.

As additional description to the embodiments described below, the present disclosure describes the following embodiments.

Embodiment 1 is a system that implements power supply protection. The system includes first circuitry; second circuitry; a first power supply that is configured to power the first circuitry; a second power supply that is configured to power the first circuitry and the second circuitry; a power supply sensor including: (i) an input that is connected to the first power supply, and (ii) an output; and a hysteresis buffer including: (i) an input that is connected to the output of the power supply sensor, and (ii) an output that is connected to the first circuitry in a configuration that transitions the first circuitry to a protected state as a result of the hysteresis buffer transitioning output states.

Embodiment 2 is the system of embodiment 1, wherein the hysteresis buffer is configured to generate digital output signals from analog input signals received at the input to the hysteresis buffer.

Embodiment 3 is the system of embodiment 2, wherein the hysteresis buffer includes a Schmitt trigger.

Embodiment 4 is the system of embodiment 1, further comprising a bias circuit switch providing at least part of a connection between the output of the hysteresis buffer and the first circuitry.

Embodiment 5 is the system of embodiment 4, wherein the bias circuit switch is configured to set a DC operational value of the first circuitry as a result of an input of the bias circuit switch receiving a transition between output states from the hysteresis buffer.

Embodiment 6 is the system of embodiment 4, wherein the bias circuit switch is configured to interrupt bias current provided to the first circuitry to provide improved voltage tolerance when no current is present through a circuit component of the first circuit.

Embodiment 7 is the system of embodiment 1, wherein the first power supply is configured to not power the second circuitry.

Embodiment 8 is the system of embodiment 1, wherein a potential of the first power supply is independent from a potential of the second power supply.

Embodiment 9 is the system of embodiment 1, wherein the power supply sensor comprises a diode-resistor network.

Embodiment 10 is the system of embodiment 1, wherein the power supply sensor comprises a resistor-divider network.

Embodiment 11 is the system of embodiment 1, wherein: the first circuitry includes a first sub-circuit block of a particular circuit; and the second circuitry includes a second sub-circuit block of the particular circuit.

Embodiment 12 is a power supply detector, comprising: a diode connected to a first power supply; a resistor connected between the diode and ground; a hysteresis buffer including an input that is connected between the diode and the resistor; and a current bias switch including: (i) an input that is connected to an output of the hysteresis buffer, and (ii) an output that is connected to a protected circuit and that is configured to drive an operational DC level of the protected circuit to different states based on a signal received at the input of the current bias switch from the output of the hysteresis buffer.

Embodiment 13 is the power supply detector of embodiment 12, wherein the hysteresis buffer includes a Schmidt trigger.

Embodiment 14 is the power supply detector of embodiment 12, wherein the current bias switch is powered by a different power supply than the first power supply.

BRIEF DESCRIPTION OF THE DRAWINGS

For a more complete understanding of the invention, reference is made to the following description and accompanying drawings.

DETAILED DESCRIPTION

Some analog and digital circuits employ multiple power supplies. The purpose varies depending on the application, but a common reason is to increase headroom for higher performance (faster devices, low noise, and low distortion) or to add functionality such as when standing current logic gates are used.

Figure 1:
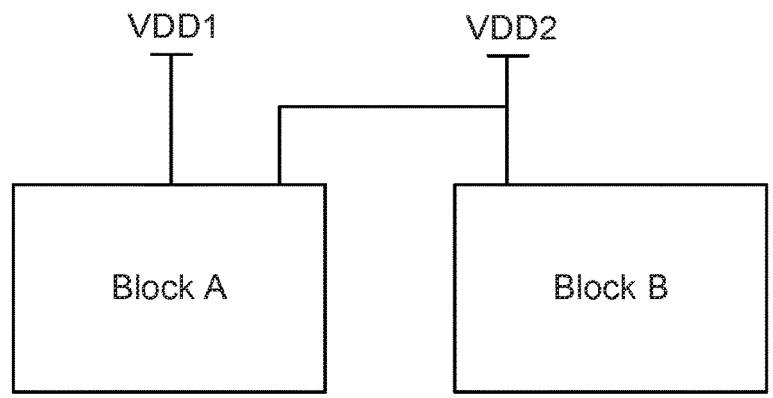
FIG. 1 illustrates a circuit block that is powered by two power supplies.

FIG. 1 shows a simplified example of a system that implements dynamic power management (DPM) in a circuit that powers a sub-circuit block with two power supplies. The circuit in this simplified example includes two sub-circuit blocks—Block A and Block B—and Block A is powered by both $V_{DD1}$ and $V_{DD2}$ (which provide different potentials in this example). Since the system implements DPM, the system may be configured to turn off the power to sub-circuit Block A when the circuit determines that Block A has not been used for a certain amount of time or is unlikely to be used for a certain amount of time. The system, however, may determine that Block B should remain operating while Block A is shut down. Since Block B is powered by $V_{DD2}$, the circuit should maintain $V_{DD2}$ in an ON state to power Block B.

This particular configuration is an example of a scenario in which turning off a power supply can be harmful. Specifically, the power supply $V_{DD2}$ may supply a greater voltage/potential than the breakdown levels of certain components of Block A, such as collector to emitter voltage in bipolar transistors. As such, should the DPM system turn $V_{DD1}$ OFF/LOW while leaving $V_{DD2}$ ON/HIGH, there is a risk of the voltage provided by $V_{DD2}$ harming electronic components of Block A.

A solution to alleviate this problem is to power down all power supplies that provide power to Block A. In such a situation, there is no risk of breaking devices. But as indicated above, in many applications, other portions of the circuit may need to remain on. This results in a situation in which power supplies that are used in DPM cannot be shared with other parts of the system that are not used in DPM, or with other sub-circuit blocks that are under DPM management but may not be switched off at the same time as another sub-circuit block that is being switched off. One answer is to increase the number of power supplies, but this result is undesirable, for example, due to extra cost and/or size.

A solution is to add a sensor that detects when $V_{DD1}$ is powering down, and to quickly send a signal to certain components in Block A (e.g., transistors), to transition those components to a protected state in which the voltage provided from $V_{DD2}$ will not harm the newly-transitioned circuit components.

Figure 2:
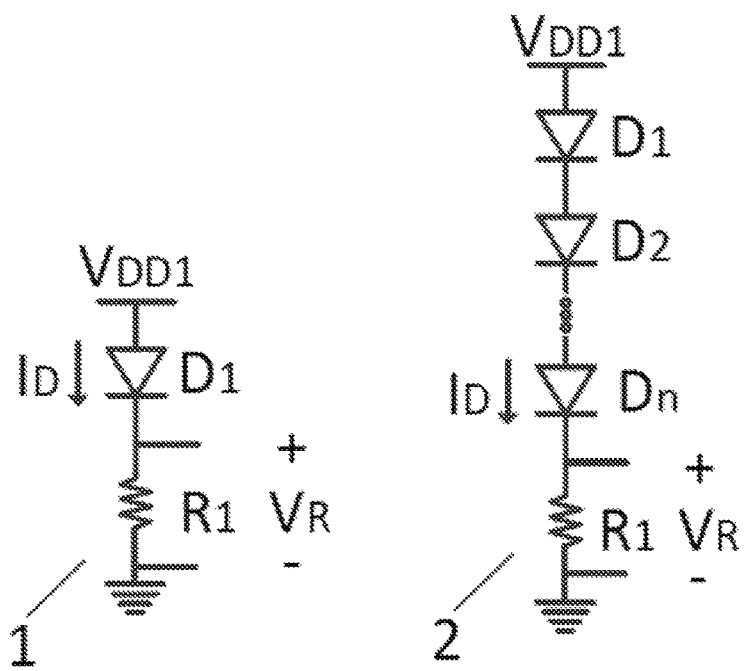
FIG. 2 illustrates a diode-resistor network and a multiple diode-resistor network.

FIG. 2 shows examples of sensors configured to detect when the potential of a power supply decreased. The first sensor shows a diode in series with a resistor, forming a diode-resistor network [1] which is able to sense power supply variation. In this example, a diode ($D_1$) and a resistor ($R_1$) are connected in series between ground and the monitored power supply ($V_{DD1}$). The voltage across the resistor ($V_R$) represents a signal that can trigger circuitry typically powered by $V_{DD1}$ to transition into a protected state. In this example, when the power supply level is OFF, the diode-resistor network generates a voltage across the diode that is lower than the threshold voltage of the diode (typically 0.7V to 0.8V), and the current flowing through the diode, and thus the resistor, is negligible. Accordingly, the voltage $V_R$ is negligible and this low voltage indicates that the power supply is off. On the other hand, a powered up power supply generates a larger current through the diode-resistor network [1] and consequently an increased voltage across the resistor ($V_R$). The increased voltage level, depending on the application, indicates that the power supply is on.

The resistor voltage ($V_D$) as a function of the dynamic power supply voltage to be sensed ($V_{DD1}$) is expressed in Equation (1).

$$V_R = I_S e^{\left(\frac{V_D}{nV_T}\right)} R_1 = V_{DD1} - V_D \qquad (1)$$

$$V_{Rmax} \to V_{DD1max}$$

$$V_{Rmin} \to V_{DD1} = 0$$

In this example, $I_S$ is a constant that represents the reverse saturation current, n is the number of diodes, and $V_T$ is a constant that represents the thermal voltage of the diode. The maximum voltage across the resistor ($V_{Rmax}$) occurs when $V_{DD1}$ is completely on. The minimum voltage across the resistor ($V_{Rmin}$) occurs when $V_{DD1}$ is completely off.

This diode-resistor scheme provides a simple and flexible sensor solution, certain benefits of which are described in additional detail later. At this point, however, it is worth noting how this scheme can be expanded to fit different power supply levels by adding additional diodes (and potentially resistors) in series to create a multiple diode-resistor network [2]. The additional diodes increase the threshold voltage level at which $V_{DD1}$ transitions $V_R$ between ON and OFF.

Figure 3:
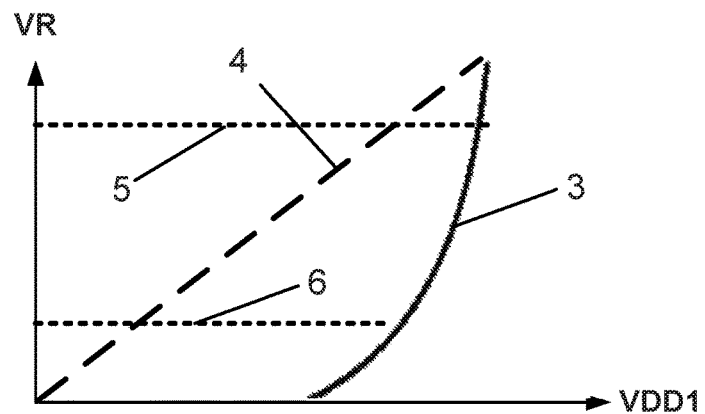
FIG. 3 is a graphical representation of the power supply voltage vs output voltage for a diode-resistor network and a resistor divider network.

FIG. 3 shows a diode output-voltage response curve [3] and a resistor divider output-voltage response curve (actually linear in this example) [4]. These curves show how the I-V characteristics of the diode ($D_1$) provide a beneficial mechanism for generating a two-state condition (e.g., indicating whether the power supply is on or off), especially when combined with a Schmidt trigger or another form of comparator with hysteresis that switches the output when the input passes through a threshold.

As an initial example, suppose that $V_{DD1}$ is on and the DPM system has determined to turn $V_{DD1}$ off to power down sub-circuit Block A in order to limit power usage. The system could sense the voltage of $V_{DD1}$ directly or a proportion of that voltage could be sensed through a resistor divider network (e.g., two resistors in series between $V_{DD1}$ and ground, with the voltage sensed at the connection between the resistors). The relationship between $V_{DD1}$ and $V_R$, when $V_R$ represents the voltage either of $V_{DD1}$ directly or through a resistor divider network, is illustrated in FIG. 3 by the dashed line [4]. The right portion of this line shows how when $V_{DD1}$ is on, $V_R$ is also in an on state. As $V_{DD1}$ declines, it is apparent that $V_R$ declines at a rate that is proportional to the decline in $V_{DD1}$. In other words, the output voltage [4] tracks the voltage of the power supply linearly. At some point, $V_R$ will hit the lower threshold voltage [6], at which point a Schmidt trigger that receives $V_R$ as an input will convert its output from ON/HIGH to OFF/LOW. The upper threshold voltage [5] illustrates the voltage at which the Schmidt trigger will convert its output signal from OFF/LOW to ON/HIGH, should $V_R$ rise after having fallen below the lower threshold voltage [6] (e.g., due to the power supply being turned back on).

Contrast these results with those of a resistor-diode network, which is represented by the solid, curved line [3]. As illustrated by the curved line [3], $V_R$ drops off much more quickly when $V_{DD1}$ declines from its ON/HIGH state, due to the I-V characteristics of the diode. For example, once the voltage across a diode has increased from 0 to pass the threshold voltage of the diode, the current passing through the diode increases exponentially in comparison to the voltage across the diode. This results in a situation in which minor increases in voltage across the diode cause even greater increases in current across the diode. Conversely, when the voltage across the diode is at its highest in the ON/HIGH state of the power supply, and decreases in voltage will lead to even greater decreases in current, which leads to exponentially declining voltage across resistor $R_1$.

Both the resistor-network and resistor-diode options result in situations in which $V_{DD1}$ decreases and components of sub-circuit Block A potentially remain at risk of damage due to $V_{DD2}$ remaining ON. At some point the circuit will transition the circuitry to a protected mode, but before that transition there remains that risk of damage. The time period between $V_{DD1}$ declining and the circuitry being transitioned into a protected mode is referred herein as the transient time period. Should this transient time period last longer than the thermal response of the affected circuitry, damage to that circuitry can occur. As such, it is beneficial to minimize the length of this transient time period. The response curves [3] and [4] illustrate how the diode-resistor network provides a faster transition from ON/HIGH to OFF/LOW, which is triggered when the respective curves [3] and [4] drop below the lower threshold voltage [6] of the Schmidt trigger. Indeed, the illustration in FIG. 3 shows that $V_{DD1}$ may need to drop over significantly farther to trigger the Schmidt trigger in a resistor divider network than in a diode-resistor network.

Stated in other words, the speed at which a power supply sensor transitions corresponds to the speed at which the power supply transitions. A typical power supply, however, transitions slower than the thermal response of a transistor and thus it can be unwise to wait for the power supply to transition to an OFF state before switching the circuit that it was powered in to a protected state. As such, to avoid damage to circuitry, a sensor that measures the output of one of the power supplies can be formed using a diode-resistor network that is connected to a hysteresis buffer (e.g., a Schmidt trigger) to define a boundary for the transition at which circuitry is transitioned to a protected state. A diode-resistor network is a mechanism to quickly reach the boundary of the hysteresis buffer, although direct measurement of the power supply or a measurement using a resistor-divider network is also suitable in certain design circumstances.

Figure 4:
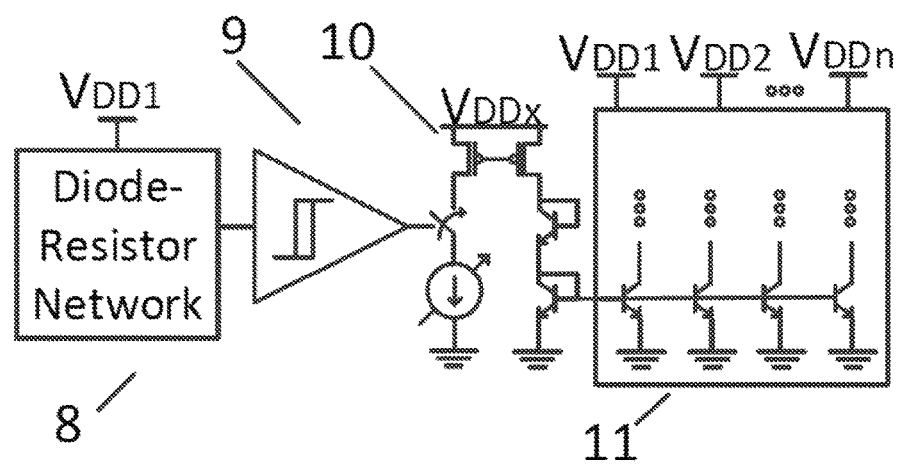
FIG. 4 illustrates a circuit that includes a power supply sensor with a diode-resistor network, a hysteresis buffer, a bias circuit switch and mirror, and a simplified protected circuit.

FIG. 4 shows a circuit in which a sub-circuit block [11] is protected by circuitry that includes a diode-resistor network [8], a hysteresis buffer [9], and a bias circuit switch [10]. The sub-circuit block [11] may be powered by multiple power supplies $V_{DDn}$. A DPM system (e.g., a computerized processing system) may determine that $V_{DD1}$ should be turned off, for example, because sub-circuit block [11] has been idle for more than a threshold amount of time or because the DPM system determines that it is likely that sub-circuit block [11] will not be needed for a threshold amount of time.

As a result, the DPM system sends a signal that causes $V_{DD1}$ to turn off or reduce its power. In response, the voltage of $V_{DD1}$ begins to decline. At the same time, a voltage ($V_R$) generated by diode-resistor network [8] also begins to decline. The declining voltage of $V_R$ as a function of the declining voltage of $V_{DD1}$ is illustrated in FIG. 3. (The diode-resistor network can be replaced by direct measurement of $V_{DD1}$ or resistor-divider network measurement of $V_{DD1}$, as described throughout this disclosure).

At some point, the declining voltage $V_R$ falls beneath a boundary set by a hysteresis buffer [9]. At this point, the hysteresis buffer switches from an ON/HIGH state to an OFF/LOW state (e.g., by switching from 5 volts to 0 volts).

The hysteresis buffer [9] drives a bias circuit switch [10]. The switch [10] interrupts or allows the flux of current from a bias current mirror that sets the DC operational values on the protected circuit [11]. The switch may have no effect on the bias reference during normal operation, but during bias shut down, the switch may interrupt the current flow in the mirror. This action can eliminate the bias current in all of the protected circuit [11]. Without a bias current, transistors may be able to tolerate a larger potential across them, which may be the case if one or more other power supplies remain on.

As shown in FIG. 3, the protected circuit [11] contains several power supplies, $V_{DD1}$, $V_{DD2}$, . . . , $V_{DDn}$, where n represents the number of power supplies. The potential level of all the supplies may be different and may depend on the particular design needs of the circuit. All the supplies from $V_{DD2}$ to $V_{DDn}$ may be within the boundaries of the maximum device voltage tolerance when $I_{dc}=0$.

The circuit shown in FIG. 4 is just an example implementation of protecting a circuit using the technology discussed here and many different implementations are possible. For example, there are numerous manners in which circuit components may be powered by multiple power supplies, and in which turning off one or more of the power supplies may damage power components. Moreover, there are various different ways for the technology discussed herein to trigger a circuit into a protected mode in which only some of the power supplies being on will not harm the circuit.

Furthermore, the bias circuit switch [10] is only one of many different manners in which to transform the output of a hysteresis buffer into a signal that can drive a circuit into a protected mode (and it is possible to configure a system in which the hysteresis buffer directly drives a circuit into a protected mode). Moreover, the example ON/OFF states described throughout this document are merely exemplary. For example, various combinations of one or more of the diode-resistor network [8], the hysteresis buffer [9], and the bias circuit switch [10] may be configured to generate an OFF/LOW state when the protected circuit [11] is to be driven into a protected mode.

It is also to be understood that the following claims are intended to cover all of the generic and specific features of the invention herein described and all statements of the scope of the invention which, as a matter of language, might be said to fall therebetween.

What is claimed is:

1. A system that implements power supply protection, comprising:
    first circuitry;
    second circuitry;
    a first power supply that is configured to power the first circuitry, wherein the first power supply is configured to power the first circuitry through an arrangement in which the first circuitry is connected between a first potential provided by the first power supply and a reference potential;
    a second power supply that is configured to power the first circuitry and the second circuitry, wherein the second power supply is configured to power the first circuitry through an arrangement in which the first circuitry is connected between a second potential provided by the second power supply and the reference potential, simultaneous with the first circuitry being connected between the first potential provided by the first power supply and the reference potential, the first potential being different from the second potential;
    a power supply sensor including:
        (i) an input that is connected to the first power supply, and
        (ii) an output; and
    a hysteresis buffer including:
        (i) an input that is connected to the output of the power supply sensor, and
        (ii) an output that is connected to the first circuitry in a configuration that transitions the first circuitry to a protected state as a result of the hysteresis buffer transitioning output states, wherein the hysteresis buffer is arranged to transition the first circuitry to the protected state as a result of the input of the hysteresis buffer receiving, from the output of the power supply sensor, a signal indicating that power provided to the input of the power supply sensor by the first power supply has decreased.

2. The system of claim 1, wherein the hysteresis buffer is configured to generate digital output signals from analog input signals received at the input to the hysteresis buffer.

3. The system of claim 2, wherein the hysteresis buffer includes a Schmitt trigger.

4. The system of claim 1, wherein the first power supply is configured to not power the second circuitry.

5. The system of claim 1, wherein a potential of the first power supply is independent from a potential of the second power supply.

6. The system of claim 1, wherein the power supply sensor comprises a diode-resistor network.

7. The system of claim 1, wherein the power supply sensor comprises a resistor-divider network.

8. The system of claim 1, wherein:
    the first circuitry includes a first sub-circuit block of a particular circuit; and
    the second circuitry includes a second sub-circuit block of the particular circuit.

9. The system of claim 1, wherein the signal indicating that power provided to the input of the power supply sensor by the first power supply has decreased comprises the signal indicating that potential provided to the input of the power supply sensor by the first power supply has decreased.

10. The system of claim 1, further comprising a bias circuit switch providing at least part of a connection between the output of the hysteresis buffer and the first circuitry.

11. The system of claim 10, wherein the bias circuit switch is configured to set a DC operational value of the first circuitry as a result of an input of the bias circuit switch receiving a transition between output states from the hysteresis buffer.

12. The system of claim 10, wherein the bias circuit switch is configured to interrupt bias current provided to the first circuitry to provide improved voltage tolerance when no current is present through a circuit component of the first circuit.

13. A system that implements power supply protection, comprising:
    first circuitry;
    second circuitry;
    a first power supply that is configured to power the first circuitry;
    a second power supply that is configured to power the first circuitry and the second circuitry;
    a power supply sensor including:
        (i) an input that is connected to the first power supply, and
        (ii) an output;
    a hysteresis buffer including:
        (i) an input that is connected to the output of the power supply sensor, and
        (ii) an output that is connected to the first circuitry in a configuration that transitions the first circuitry to a protected state as a result of the hysteresis buffer transitioning output states; and
    a bias circuit switch providing at least part of a connection between the output of the hysteresis buffer and the first circuitry.

14. The system of claim 13, wherein the bias circuit switch is configured to set a DC operational value of the first circuitry as a result of an input of the bias circuit switch receiving a transition between output states from the hysteresis buffer.

15. The system of claim 13, wherein the bias circuit switch is configured to interrupt bias current provided to the first circuitry to provide improved voltage tolerance when no current is present through a circuit component of the first circuit.

16. The system of claim 13, wherein the first power supply is configured to not power the second circuitry.

17. The system of claim 13, wherein the power supply sensor comprises a diode-resistor network.

18. A power supply detector, comprising:
    a diode connected to a first power supply;
    a resistor connected between the diode and ground;
    a hysteresis buffer including an input that is connected between the diode and the resistor; and
    a current bias switch including:
        (i) an input that is connected to an output of the hysteresis buffer, and
        (ii) an output that is connected to a protected circuit and that is configured to drive an operational DC level of the protected circuit to different states based on a signal received at the input of the current bias switch from the output of the hysteresis buffer.

19. The power supply detector of claim 18, wherein the hysteresis buffer includes a Schmitt trigger.

20. The power supply detector of claim 18, wherein the current bias switch is powered by a different power supply than the first power supply.

\* \* \* \* \*